(12) United States Patent
Amano et al.

(10) Patent No.: US 7,925,534 B2
(45) Date of Patent: Apr. 12, 2011

(54) INCENTIVIZED ADVERTISEMENT INFORMATION SUPPLYING SYSTEM

(75) Inventors: Takaaki Amano, Tokyo (JP); Yoshiharu Maeda, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 1900 days.

(21) Appl. No.: 09/863,877

(22) Filed: May 23, 2001

(65) Prior Publication Data
US 2002/0040318 A1 Apr. 4, 2002

(30) Foreign Application Priority Data

May 24, 2000 (JP) .................................. 2000-153230
May 21, 2001 (JP) .................................. 2001-151504

(51) Int. Cl.
*G06Q 30/00* (2006.01)
(52) U.S. Cl. ................... 705/14.4; 705/14.1; 705/14.49; 705/14.69
(58) Field of Classification Search .................... 705/14, 705/14.4, 14.49, 14.1, 14.69
See application file for complete search history.

(56) References Cited

U.S. PATENT DOCUMENTS

| | | | | |
|---|---|---|---|---|
| 5,724,521 A | * | 3/1998 | Dedrick | 705/26 |
| 5,794,210 A | * | 8/1998 | Goldhaber et al. | 705/14 |
| 5,848,396 A | * | 12/1998 | Gerace | 705/10 |
| 5,974,398 A | * | 10/1999 | Hanson et al. | 705/14 |
| 6,450,407 B1 | * | 9/2002 | Freeman et al. | 235/492 |
| 6,529,878 B2 | * | 3/2003 | De Rafael et al. | 705/14 |
| 2001/0037314 A1 | * | 11/2001 | Ishikawa | 705/67 |

FOREIGN PATENT DOCUMENTS

| | | |
|---|---|---|
| JP | 10-149487 | 6/1998 |
| JP | 11-312273 | 11/1999 |
| JP | 2000-123105 | 4/2000 |
| WO | WO 9834189 A1 * | 8/1998 |

OTHER PUBLICATIONS

Ling, Connie, "Internet sites find it pays to reward visitors; Asian firms give away cash, plane tickets to lure, keep web viewers.(Brief Article)": Wall Street Journal Weekly (v 22 , n 3 , p. 1(2)): Jan. 17, 2000.*

* cited by examiner

*Primary Examiner* — Jean D. Janvier
(74) *Attorney, Agent, or Firm* — Katten Muchin Rosenman LLP

(57) ABSTRACT

A server apparatus 10 for applying a point by which a service can be received in response to an amount of said point to be used in a Web site, comprises files 23/24 for storing a banner advertisement, and a point producing unit 14 for determining a point number which is displayed on the banner advertisement. This server apparatus 10 is further arranged by a Web control unit 11 for displaying the banner advertisement attached with the point number on a Web page, and also a user data managing unit 12 for managing a point number gained by a user. The server apparatus 10 determines a point number to be displayed on a banner advertisement with reference to personal information of a user, or a point number gained by the user.

7 Claims, 12 Drawing Sheets

FIG.5

| | | | |
|---|---|---|---|
| 281 | SPONSOR ID | * * * * | |
| 282 | BANNER ID | * * * * | |
| 283 | BANNER NAME | * * * * | |
| 284 | BANNER DATA NAME | * * * * | |
| 285 | POINT DISTRIBUTION | 2851 TOTAL POINT NUMBER | 27,000 |
| | | DEGREE | POINT-APPEARING TIME | POINT-APPEARED TIME |
| | | 0 | 3,000 | 1,000 |
| | | 1 | 2,000 | 800 |
| | | 5 | 1,500 | 500 |
| | | 1 0 | 1,000 | 400 |
| | | 1 5 | 500 | 200 |
| | | 2853 REMAINING POINT | 16,700 |
| 286 | APPEARANCE TIME PERIOD | * * * * | |
| 287 | INTENSIVELY APPEARING TIME PERIOD | TIME PERIOD | * * * * |
| | | POINT NUMBER | * * * * |
| 288 | VALID TIME PERIOD | * * * * | |
| 289 | USER INFORMATION | * * * * | |

| POINT NUMBER | SPONSOR ID | BANNER ADVERTISEMENT ID | USER ID | POINT-GAINED DATE | POINT EXPIRATION TERM |
|---|---|---|---|---|---|
| 211 | 212 | 213 | 214 | 215 | 216 |

210

INCENTIVIZED ADVERTISEMENT INFORMATION SUPPLYING SYSTEM

This application claims a priority based on Japanese Patent Applications Nos. 2000-153230 and 2001-151504 filed on May 24, 2000 and May 21, 2001 respectively, the entire contents of which are incorporated herein by reference for all purposes.

BACKGROUND OF THE INVENTION

1. Field of the Invention

The present invention relates to a system for supplying advertisement information via a network. More specifically, the present invention is directed to an advertisement supplying system for displaying a point which may give viewing persons an incentive to view an advertisement in combination with advertisement information.

2. Description of the Related Art

Very recently, since computer networks are popularized, Web pages may constitute very important advertisement media. Persons who open Web pages collect sponsors, and often place such advertisements with respect to the own sponsors on these Web pages. These advertisements are called as "banner advertisements."

When a user clicks a banner advertisement, this user may go to a Web site of a sponsor who provides this banner advertisement, and therefore, this banner advertisement can have such an advertisement effect that the advertisement information concerning the sponsor is displayed. As a consequence, the sponsors have tried to realize various ideas capable of increasing clicking times made by the users in order to improve the advertisement effects.

As one of these ideas, incentive points may be applied to users who click banner advertisements. In such a case that users may receive certain services by collecting these incentive points, it can be expected that these users may actively click these banner advertisements.

However, when a user clicks a banner advertisement many times in order to merely get such an incentive point, the incentive points are applied to this user despite that substantially no advertisement effect can be expected. Normally, since a total number of incentive points to be displayed is previously determined, there is such a risk that incentive points are eccentrically applied only to a specific user.

On the other hand, incentive points which may be applied by clicking a banner advertisement are uniformly given to all of users who click this advertisement. As a result, it is practically difficult to effectively achieve such an advertisement development in accordance with tastes and attributes of users, for instance, in the case that an advertisement may desirably cause specific user layer to visit a site.

SUMMARY OF THE INVENTION

An object of the present invention is to provide a technique capable of applying a point which may give an incentive to view an advertisement to wide variety of users.

Another object of the present invention is to provide a technique capable of more effectively displaying a point which may give viewing persons an incentive to view an advertisement so as to improve an advertisement effect.

To solve the above-explained problem, an advertisement supplying system, according to the present invention, is featured by such an advertisement supplying system for displaying a point which may give viewing persons an incentive to view an advertisement in combination with advertisement information on a terminal apparatus connected thereto via a computer network, comprising:

storage means for storing thereinto identification information of a customer and a point degree owned by the customer in relation to each other;

means for accepting identification information of a customer from a terminal apparatus of the customer;

means for acquiring the point degree owned by the customer from said storage means, said owned point degree being related to the accepted identification information of the customer; and display point degree determining means for determining a point degree to be displayed in combination with the advertisement information based upon the acquired point degree owned by the customer.

Also, another advertisement supplying system, according to the present invention, is featured by such an advertisement supplying system for displaying a point which may give viewing persons an incentive to view an advertisement in combination with advertisement information on a terminal apparatus connected thereto via a computer network, comprising:

storage means for storing thereinto identification information of a customer and personal information related to the customer in relation to each other;

means for accepting identification information of a customer from a terminal apparatus of the customer;

means for acquiring the personal information related to the customer from said storage means, said personal information being related to the accepted identification information of the customer; and display point degree determining means for determining a point degree to be displayed in combination with the advertisement information based upon the acquired personal information related to the customer.

BRIEF DESCRIPTION OF THE DRAWINGS

For a better understanding of the present invention, reference is made of a detailed description to be read in conjunction with the accompanying drawings, in which:

FIG. 5 is a diagram for illustratively representing an example of a structure of sponsor point management data 280 registered in a sponsor point management file 28;

FIG. 13 is a diagram for indicating an example of a structure of gained-point data 210 managed in a point management file 21;

DETAILED DESCRIPTION OF THE PREFERRED EMBODIMENT

Figure 1:
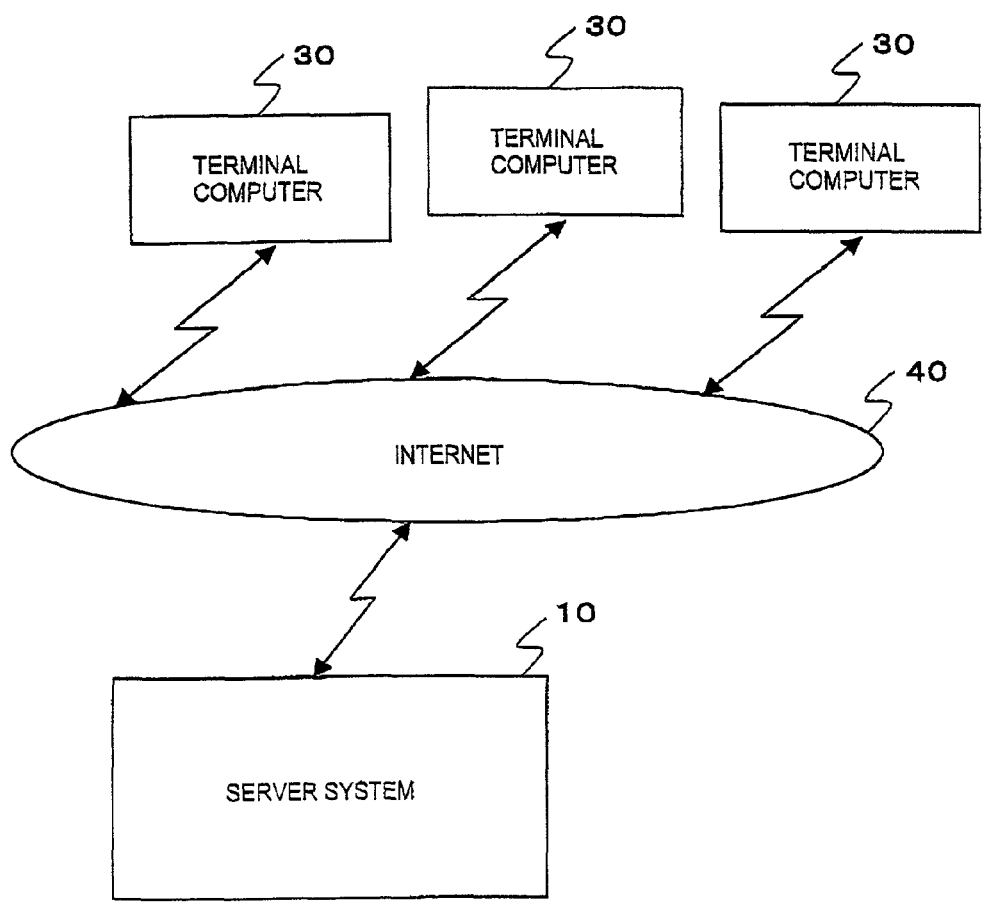
FIG. 1 is a schematic block diagram for explaining an entire arrangement of a service providing system according to an embodiment of the present invention.

Referring now to drawings, various embodiment modes of the present invention will be described in detail.

(Summary of Embodiment Mode)

In this embodiment mode, there are described an advertisement space provider, an advertisement sponsor, and a user. The advertisement space provider opens a Web site on a computer network, for example, the Internet, and provides several areas within a Web page displayed on this Web site as an advertisement space. The advertisement sponsor invests his money in the Web site opened by the advertisement space provider. Then, the user is a viewer of the Web page displayed on the Web site opened by the advertisement space provider and places the advertisement on the Web page. It should be noted that while an expression "user" may correspond to a large number of not-specified users of the Internet, if the expression "user" implies a specified user for instance, such a user who has accomplished a predetermined registration, then this specified "user" will be clearly described.

In this embodiment mode, the Web site opened by the advertisement space provider will now be summarized. This Web site may be constituted by such a site capable of providing, for example, various contents directed to entertainment, e.g., capable of totally providing games, product information, and the like.

Also, in this Web site, a so-called "shopping mall" is opened. In this shopping mall, the user may purchase, for instance, goods (merchandise) handled by the advertisement space provider in an online manner.

The advertisement sponsor invests his money in the advertisement space provider, and places (runs) such an advertisement mainly made of a rectangular image, which is called as so-called "banner advertisement," in a portion of the Web page displayed on the Web site opened by the advertisement space provider. Also, a portion of this investment is used to provide an incentive point (will be simply referred to as a "point" hereinafter).

There is such a case that this point may be displayed on banner advertisement of such an advertisement sponsor who provides this point on a Web page. A user may get a displayed point by clicking such a banner advertisement on which this point is displayed. The user who got this point uses this point in the shopping mall opened in the Web site provided by the advertisement space provider, so that this user may buy goods and the like by a discount price.

In other words, incentive points may be converted into money amounts in such a conversion rate that 1 incentive point is equal to "x" yen. In this example, it is so assumed that while an investment amount of a sponsor is equal to "y" yen, "z" yen corresponding to a predetermined rate is allocated to provide a point. At this time a total point number which can be provided by this sponsor is equal to z/x points.

On the other hand, since a user corresponding to a purchaser utilizes "β" points when goods is bought, the goods can be bought by such a discount price that a total purchase amount is discounted by a rate of (β×x) yen. Then, (β×x) yen corresponding to this discounted amount is originated from investment by a sponsor.

Since such an incentive point is employed, the present invention can provide the novel service mode capable or effectively realizing advertisement effects, while reducing loads given to sales shops.

(Overall Arrangement of Service Providing System)

An overall arrangement of a service providing system according to this embodiment mode of the present invention will now be described with reference to a schematic block diagram shown in FIG. 1. In this drawing, both a server system 10 operated by an advertisement space provider and a large number of unspecified terminal computers 30 which can be used by users are connected to each other via a computer network, for example, the Internet 40.

As the terminal computer 30, such information processing apparatus as a personal computer and an entertainment apparatus may be employed, and these information processing apparatus are connectable to the Internet. It is so assumed that the terminal computer 30 is attached with both a display apparatus and an input apparatus. The display apparatus corresponds to a CRT apparatus, a liquid crystal display apparatus, or a TV receiving apparatus. The input apparatus correspond to a keyboard, or a controller. A user may access to the server system 10 via the terminal computer 30 by utilizing such application software called as a browser.

Figure 2:
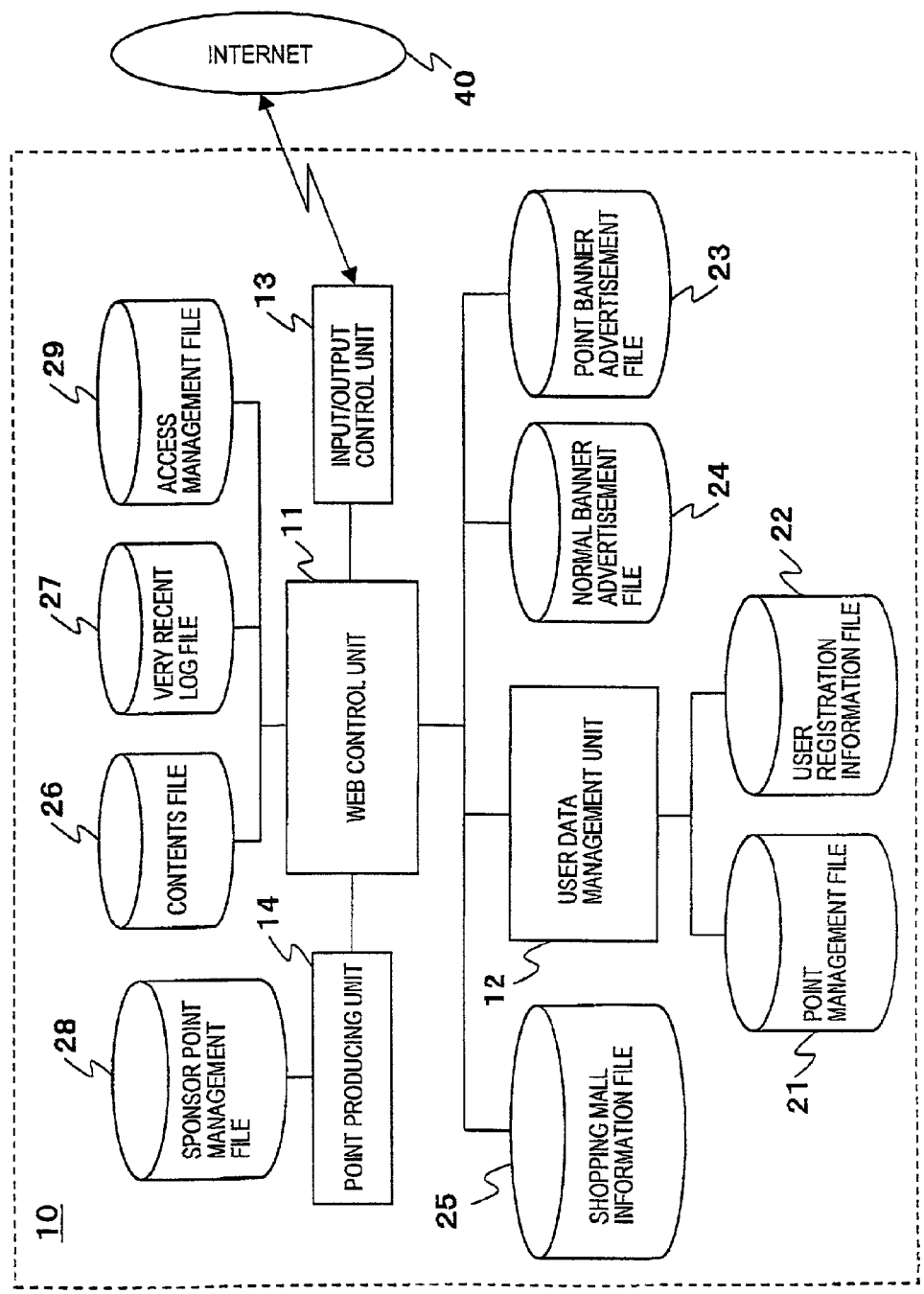
FIG. 2 is a schematic block diagram for explaining an inner arrangement of a server system 10 of FIG. 1.

FIG. 2 is a schematic block diagram for explaining a functional structure of the server system 10. As this server system 10, a server computer attached with a CPU, a main memory, and the like may be utilized.

In this drawing, the server system 10 is provided with a Web control unit 11, a user data managing unit 12, an input/output control unit 13, and a point (incentive point) producing unit 14. These function units may be realized by that a CPU or the like which mainly controls the server system 10 executes a computer program stored in a main memory. Such a computer program may be marketed in the field by recording this computer program on a portable storage medium such as a CD-ROM.

The Web control unit 11 controls the various function units of the server system 10 in accordance with a predetermined computer program, and the like.

The user data managing unit 12 manages information related to registered users by employing both a point management file 21 and a user registration file 22 (will be discussed later). The user data managing unit 12 executes such a process operation that, for instance, while using a user ID (identification) as a key, personal information of the user stored in either the point management file 21 or the user registration information file 22 is extracted therefrom. Otherwise, when a user gets a point, the user data managing unit 12 writes this information into the point management file 21.

The input/output control unit 13 corresponds to such an interface capable of controlling transmission/reception of information via the Internet 40.

The point producing unit 14 produces a point which is displayed on the Web page.

Furthermore, the server system 10 is attached with a storage apparatus constituted by a hard disk drive and the like. Then, as indicated in FIG. 2, the storage apparatus stores the point management file 21, the user registration information file 22, a point banner advertisement file 23, a normal banner advertisement file 24, a shopping mall information file 25, a contents file 26, a very recent log file 27, a sponsor point management file 28, and an access management file 29.

The point management file 21 corresponds to such a file which is managed by the user data managing unit 12. This point management file 21 contains point data 210 related to a point gained by a user, and gained-point data 210 in which the point data is related to information used to identify a sponsor who provides this point.

FIG. 13 is a diagram for indicating an example of a structure of the gained-point data 210. In this drawing, the gained-point data 210 is constituted by a point number 211, a sponsor ID 212 which is identification information of the sponsor who provides the point, a banner advertisement ID 213 which Is identification information of the banner advertisement on which the point is displayed, a user ID 214 which is identification information of the user who gains the point, a point-gained date 215, and a point expiration term 216.

The user registration information file 22 corresponds to a file managed by the user data managing unit 12, and stores such registered user data 220 in which a user ID of a registered user is related to a password and the like.

Figure 3:
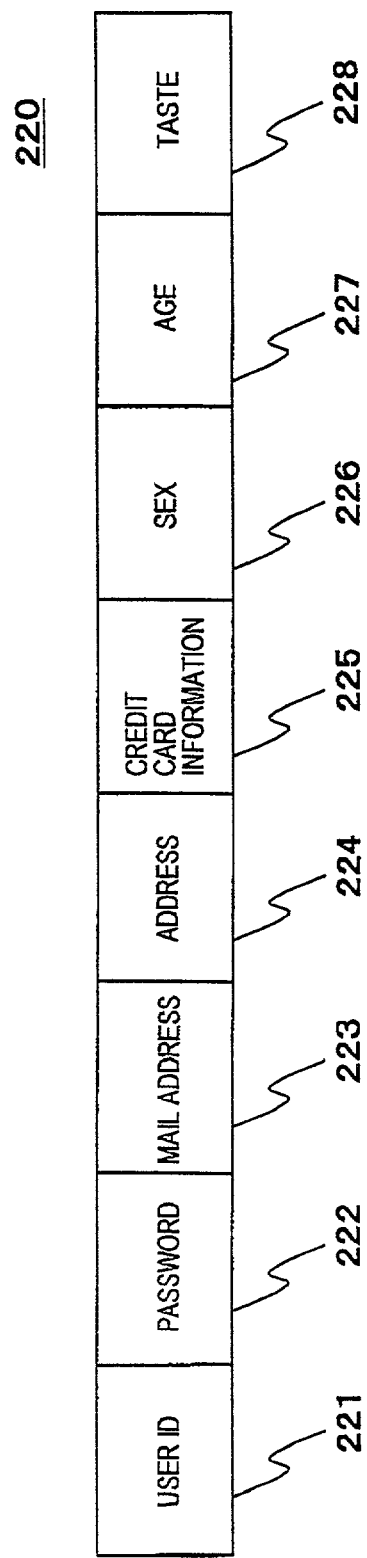
FIG. 3 is a diagram for illustratively showing an example of a structure of registered user data 220 which is stored in a user registration information file 22.

FIG. 3 is a diagram for showing an example of a structure of the registered user data 220. In this drawing, the registered user data 220 is constituted by a user ID 221, a password 222, a mall address 223, an address 224, credit card information 225, a sex 226, an age 227, and a taste 228. As the taste 228, for example, there is such information about a hobby, a name of a subscribed magazine. These data are recorded by the user data managing unit 12 during a user registration procedure, for example, in such a manner that the user is prompted to enter data, and the accepted data is recorded by the user data managing unit 12.

The user data managing unit 12 of the server system 10 extracts the registered user data 220 from the user registration information file 22, while the user ID accepted from the user is used as a key. Then, the user data managing unit 12 identifies the password accepted from the user with the password 222 which is recorded in the extracted registered-user data 220 so as to execute the identification process operation of the registered user.

The point banner advertisement file 23 stores image data and the like, which are used to produce a banner advertisement provided with a point of an advertisement sponsor. Each of the stored image data may be discriminated from each other based upon either data ID or a data name. In a banner advertisement produced from this image data, either an area used to display a point or an area in which a point is displayed is provided.

The normal banner advertisement file 24 stores thereinto such image data used to produce a normal banner advertisement of an advertisement sponsor. In this banner advertisement, such an area used to indicate a point is not provided. Each of the stored image data may be discriminated from each other based upon either data ID or a data name.

The shopping mall information file 25 stores thereinto such data used to produce a Web page which constitutes a shopping mall.

The contents file 26 stores thereinto data, a program, and the like, which are used to produce a Web page for providing contents such as information and games, which are provided in this own Web site.

The very recent log file 27 stores thereinto very recent log data 270 made by recording both a user ID of a user and an access day/time of this user who accesses the relevant site within a predetermined time period, for instance, 24 hours.

Figure 4:
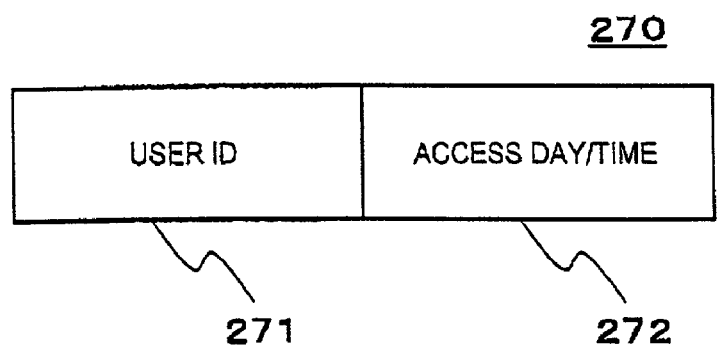
FIG. 4 is a diagram for illustratively showing an example of a structure of very current log data 270 recorded in a very current log file 27.

FIG. 4 is a diagram for indicating an example of a structure of the very recent log data 270. In this drawing, the very recent log data 270 is arranged by a user ID 271 of a user who accesses to a site, and an access day/time 272.

The sponsor point management file 28 corresponds to a file managed by the point producing unit 14, and is employed in order that a sponsor who provides a point manages the points. This file stores there into sponsor point management data 280 related to a point provided by an advertisement sponsor.

FIG. 5 is a diagram for indicating an example of a structure of the sponsor point management data 280. In this drawing, the sponsor point management data 280 is arranged by a sponsor ID 281, a banner ID 282, a banner name 283, a banner data name 284, a point distribution 285, an appearing time period 286, an intensively appearing time period 287, a valid time period 288, and user information 289. The sponsor ID 281 is such information used to identify a sponsor who manages this data. The banner ID 282 corresponds to information used to identify a banner advertisement for indicating a point. The banner data name 284 is related to a data name (file name) used to produce a banner advertisement to be displayed. The point distribution 285 corresponds to such information used to determine a relationship between a degree of a point to be displayed and an appearing time thereof. The appearing time period 286 corresponds to such an information used to determine an appearing time period of a point. The intensively appearing time period 287 corresponds to such information used to determine a valid time period of a point when the point is intensively displayed. The valid time period 288 corresponds to such information used to determine a valid time period of a point. The user information 289 corresponds to such information as to a user layer to which a point display is given.

The access management file 29 stores thereinto an access condition of the relevant site. e.g., a history of access number per 1 day.

The arrangement of the serve system 10 has been described above. This server system 10 is not apparently limited to the above-explained arrangement. The server system 10 may be arranged by employing not only a single computer system, but also a plurality of computer systems. In particular, in the storage apparatus, a so-called "mirroring" is performed, and a plurality of storage apparatus may preferably be provided in a distributed manner so as to protect a data loss, or a shut down of a server.

(Site Map)

Referring to a site map indicated in FIG. 6, a transition of a Web page in a Web site which is opened by an advertisement space provider will now be explained.

The Web control unit 11 prompts a user to enter both a user ID and a password by way of an entrance page 310 of this Web site. Then, when both the user ID and the password are received, the user data managing unit 12 executes the identification process operation with reference to the user registration information file 22. As a result, when the user is identified as the registered user, the Web control unit 11 displays such a menu page capable of prompting a selection of contents provided on the Web site.

Prior to the display of this menu page, the Web control unit 11 performs a separating process operation under preselected separation condition, by which a user to which a point may be applied is separated from a user to which a point may not be applied.

Then the Web control unit 11 further executes a process operation for calculating a point to be displayed with respect to such a user who is separated as a point-applicable user. Thereafter, the Web control unit 11 displays a page 320 which notifies the user who may become such a point-applicable user, and then displays a menu page 340 containing such a banner advertisement to which a point is applied. It should be noted that a point is indicated in a banner advertisement related to an advertisement sensor who provides this point.

On the other hand, the Web control unit 11 displays a page 330 for notifying such a fact that a user may become a point-not-applicable user with respect to such a user who is separated as a point-not-applicable user. Thereafter, the Web control unit 11 displays menu page 350 containing a banner advertisement to which a point is not applied.

A point-applicable user can gain a point displayed on a banner advertisement by clicking the banner advertisement to which the point is applied. Then, on any of the menu pages, when clicking of a banner advertisement is accepted, the present menu page is transferred to a Web page 410 and the like of such an advertisement sensor indicated on a banner advertisement.

The advertisement space provider opens a so-called "shopping mall" on this Web site. A user can display a shopping mall entrance page 400 on any of the menu pages 340 and 350 by clicking a shopping button. Then, the user may execute a purchase procedure by designating desirable goods.

When the user purchases the desirable goods, this user may accept a discount service by utilizing the gained points, by which a total purchased money amount can be discounted in accordance with the gained points. Then, when the Web control unit 11 accepts the purchase instruction using the points from the user, this Web control unit 11 causes a Thanks screen 360 to be displayed on the display apparatus of the terminal computer 30 used by this user. This Thanks screen 360 displays an advertisement sponsor name provided by this point.

(Point Managing Process)

Next, a description is made on a method for managing points provided in this Web site. As explained above, points are provided based upon investment of advertisement sponsors Then, as to points displayed on banner advertisement, various sorts of degrees such as 1 point, 5 points, and 10 points may be set. Appearing conditions with respect to the respective degrees of points may be controlled by advertisement sponsors.

In other words, while degrees of points displayed on this Web site are variable, any advertisement sponsors may set degrees/frequencies of points to be displayed on banner advertisements, temporal variations thereof, valid time periods of points, and user layers to which points are applied. As a result, for example, advertisement strategies directed to personal matters and also timing matters may be effectively carried out.

The sponsor point management data 280 shown in FIG. 5 will now be described more in detail. The sponsor ID 281 corresponds to such information used to identify a sponsor of a banner advertisement. Both the banner ID 282 and the banner name 283 correspond to such information used to identify a banner advertisement. The banner data name 284 corresponds to such information used to specify image data by which a banner advertisement is produced.

The above-explained information corresponds to such information which are mainly used so as to manage banner advertisements, e.g., to specify a banner advertisement. The point distribution 285, the appearing time period 286, the intensively appearing time period 287, the valid time period 288, and the user information 289, which are shown in the following description, correspond to such information which is mainly used so as to control points to be displayed. As will be discussed later, an advertisement sponsor may confirm the above-explained information in an on-line manner as to a banner advertisement made based upon the own investment, and also may set/manage partial data of the above-described information. Both contents and setting operations of the above-described information will now be described.

The point distribution 285 further contains a total point number 2851, a point distribution table 2852, and a remaining point number 2853.

The total point number 2851 corresponds to a total number of points which can be displayed on a banner advertisement, and is determined in accordance with an investment amount of an advertisement sponsor. As a result as to this item, when an advertisement sponsor notifies an investment amount via, for instance, the Internet 40 to the server system 10, this notified investment amount is converted into a corresponding point number which will then be set. Thereafter, it is so set that the advertisement sponsor cannot freely change the point value.

The point distribution table 2852 corresponds to such information indicative of both a point-appearing time 28522 and a point-appeared time 28523 as to a point of a degree 28521 indicated in the distribution table.

In this table, the degree 28521 corresponds to an item used to set a degree of points which can appear, for example is selectable from 0, 1, 5, 10, and so on. With respect to these degrees, fixed values may be previously set, and/or these degrees may be freely set by advertisement sponsors. Alternatively, a portion of these degrees may be fixed, whereas other degrees thereof may be freely set by advertisement sponsors.

In this table, the point-appearing time 28522 corresponds to such an item for setting how many times a point of any one of these degrees appears. This item may be freely set by any advertisement sponsors within such a range that a total degree does not exceed a total point number. It should also be noted that this item may be set by employing an appearance rate of each point.

In this table, the point-appeared time 28523 corresponds to such an item for indicating how many times a point of the respective degrees has appeared. As a consequence, since the point producing unit 14 updates this item in response to point-appeared times, an advertisement sponsor cannot change the value of the point-appeared time 28523.

In this table, the remaining point number 2853 corresponds to such a value which obtained by subtracting a total number of point-appeared from a total point number. When this value becomes 0, there is no case that a point is indicated in a banner advertisement. Since the point producing unit 14 updates this item in response to this point-appeared number, the advertisement sponsor cannot change the value.

The appearance time period 286 corresponds to an item for setting an appearance time period of a banner advertisement managed by this data, and may be set by an advertisement sponsor. Since both the point distribution table 2852 and the appearance time period 286 are set, both a point appearance time per 1 day and a point appearance degree per 1 day may be determined. Alternatively, both a point appearance time per 1 day and a point appearance degree per 1 day may be displayed so as to be confirmed by an advertisement sponsor.

The intensively-appearing time period 287 corresponds to such an item for setting such a case that an advertisement sponsor intensively wants to present a point as to a preselected time period corresponding to, for example, a campaign within the above-explained time period in this item, both an intensively-appearing time period 2871 and an appearing point number 2872 within this intensively-appearing time period 2871 may be set. As the appearing point number to be set, and one of an appearing time, an appearing rate, and an appearing degree may be selected. Also, setting of this item may be arbitrarily determined by an advertisement sponsor. Also, as to this item, both a point appearing time per 1 day and a point appearing degree per 1 day within the intensively-appearing time period may be displayed so as to be confirmed by an advertisement sponsor.

The valid time period 288 corresponds to such an item capable of setting a time period during which an applied point can be utilized. In such a case that a point having a valid time period is wanted to be applied due to a specific campaign, this item is set. Setting of this item is arbitrarily determined by an advertisement sponsor. It is so assumed that when this item is not set, there is no valid time period for a point to be applied.

The user information 289 corresponds to such an item which is set in the case that an appearance condition of a point is wanted to be controlled in accordance with an attribute of a user. For instance, since the personal information of the user (for example, age, sex and taste) record in the user registration information file 22 is set, points may be intensively displayed with respect to the relevant user. Also, this item may be arbitrarily set by the advertisement sponsor.

As previously explained, when the point producing unit 14 refers to the sponsor point management file 28, the point producing unit 14 may acquire both a degree and an appearance time of a point to be displayed as to a certain one day. Then, based upon both the degree and the time of the points which have already been displayed on this day, the point producing unit 14 may produce a list of the degrees of the points which can be displayed at a time instant.

As apparent from the foregoing descriptions, the management methods for the points which are provided in this site have been explained. It should also be noted that the advertisement sponsors may confirm/change such information used to control points. This confirmation/change process operation may be carried out on a Web page in accordance with, for example, the below-mentioned manner.

When the Web control unit 11 accepts a display request of sponsor point management data 280 issued from an advertisement sponsor on a Web page (not shown) used in a management purpose, this Web control unit 11 extracts the relevant sponsor point management data 280 while using both a sponsor ID and a banner ID. Then, the Web control unit 11 displays the extracted data on the display apparatus of the terminal computer 30 which is utilized by the advertisement sponsor. When the advertisement sponsor changes a value of a changeable item, the Web control unit 11 accepts this changed information via the input/output control unit 13. Then, the point producing unit 14 rewrites the information of the relevant sponsor point management data 280.

(User Identification Process Operation)

Next, a description will now be made on a concrete process operation of the server system 10 in the case that an access request is accepted from the terminal computer 30 of the user.

In this embodiment mode, in order that a user accesses a Web site opened by an advertisement space provider so as to view a Web page, user registration should be accomplished in advance. This is because points which can be gained in the Web site are managed with respect to each of these users. It should also be noted that the Web page may be allowed to be viewed by unregistered users. In this alternative case, since the unregistered users are excluded from users who can gain points, the points may be managed with respect to the respective users.

Figure 7:
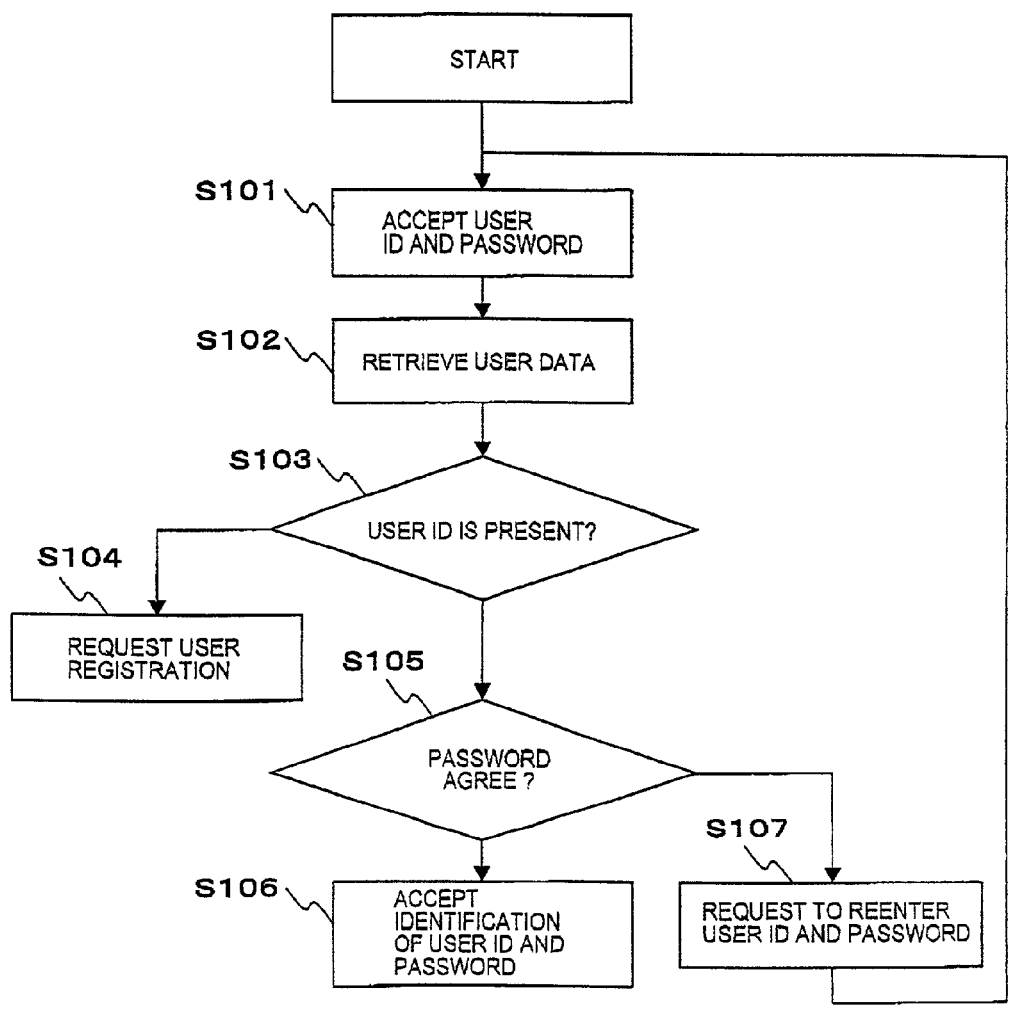
FIG. 7 is a flow chart for explaining an identification process operation executed when an access to a Web site is permitted.

Next, an identification process operation will now be described, which is executed in the case that an access to the relevant site is allowed to such users who have already been registered. FIG. 7 is a flow chart for describing this identification process operations. It should also be noted that an unregistered user may be registered as follows; While a registration page (not shown) is displayed, necessary items such as a name, a mail address, and an address are entered. Thus, the resultant information is recorded on the user registration information file 22.

Figure 8:
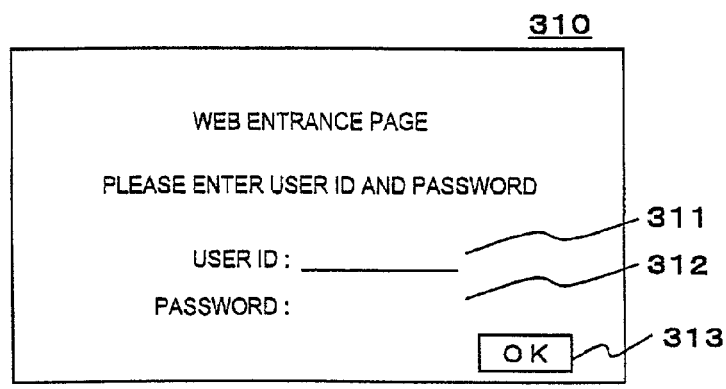
FIG. 8 is a diagram for explaining an example of an entrance page of a Web site.

A registered user who wants to access this relevant site may enter both a user ID 311 and a password 312 on the entrance page 310 as represented in FIG. 8 as an example. When the register user clicks an OK button 313 after inputting both the user ID 311 and the password 312, both the entered user ID/password are transmitted to the server system 10 (step S101).

The Web control unit 11 of the server system 10 which receives both the user ID and the password retrieves registered user data which is made coincident with the received user ID, from the user registration information file 22 by employing the user data managing unit 12 (step S102). Then, the Web control unit 11 judges as to whether or not the received user ID is present in the registered user file (step S103).

In the case that the accepted user ID is not presented in the registered user file, the Web control unit 11 causes such a message indication to be displayed on the display apparatus of the terminal computer 30 (step S104). This message indication is "since accepted user ID is not yet registered, please register this user ID." Alternatively, in this server system 10, an access operation as an unregistered user may be permitted.

To the contrary, in such a case that the accepted user ID is present in the registered user file, the Web control unit 11 judges as to whether or not the password registered in the extracted registered user data is made coincident with the accepted password (step S105). As a result of this judgment, when the registered password is made coincident with the accepted password, the Web control unit 11 allows the user to access this relevant site, and accomplishes the identification process operation (step S106).

On the other hand, in such a case that the password registered in the extracted user data is not made coincident with the accepted password, the Web control unit 11 causes such a message indication to be displayed on the display apparatus of the terminal computer 30 (step S107). This message indication is "password is incorrect." Thereafter, the Web control unit 11 again displays the entrance page 310 so as to prompt the user to enter both a user ID and a password.

(User Separating Process)

Figure 9:
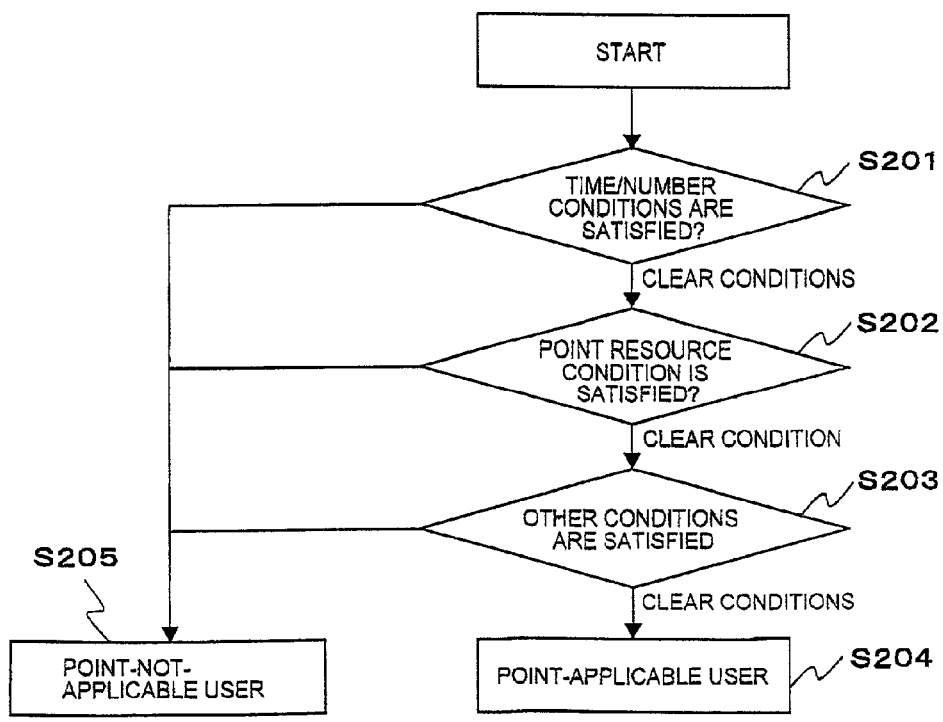
FIG. 9 is a flow chart for explaining a process operation for separating a point-applicable user from a point-not-applicable user.

Next, the Web control unit 11 executes a separation process operation for separating a point-applicable user from a point-not-applicable user with respect to such a user who has completed the identification process operation by entering the user ID and the password. This separation process operation is executed by nudging the below-mentioned conditions. FIG. 9 is a flow chart for describing this user separation process operation.

On the other hand, a major object of this user separating process operation is to control a load of the server system 10. That is to say, in order to manage points, log conditions of users within sites must be managed. When this log condition management is carried out with respect to all of these users, there are some possibilities that excessive loads are given to the server system 10. As a consequence a user whose log condition is managed is separated from another user whose log condition is not managed, namely, a point-applicable user is separated from a point-not-applicable user after the identification process operation has been carried out, so that a load thereafter given to the server system 10 is controlled.

First, the Web control unit 11 executes the user separation process operation based upon access times of the same user within a predetermined time period corresponding to a first separation condition (step S201). This user separation process operation may have such an object that a user who accesses plural times higher than, or equal to a preselected time within the defined time period is classified as the point-not-applicable user in addition to the above-described object of controlling the load of the server system 10. In other words, this process operation is performed so as to avoid such a condition that points are excessively applied to such a user who intensively accesses the site within a short time period in order to gain points.

The defined time period may be selected from, for example, either 2 hours or 24 hours. The pre-selected time may be selected to be, for instance, 3 times. These set values may be automatically changed in response to the access conditions to the site, or may be manually changed by an advertisement space provider and/or an advisement sponsor.

The Web control unit 11 manages an access log condition within a predetermined time period by the very recent log file 27, upon receipt of an access of a user, the Web control unit 11 records both a user ID and an access time instant of this user in the very recent log file 27. On the other hand, a record of such a user ID and such an access time instant is deleted after a predetermined time period having passed from the recorded time instant. As a result, a user ID of such a user who visits the site within a predetermined time period from the present time instant is recorded in the very recent log file 27.

The user separation process operation based upon the access time of the same user within the defined time period is carried out as follows:

The Web control unit 11 extracts from the very recent log file 27, user ID data which is made coincident with such a user ID accepted while the identification process operation is carried out. When a total number of the extracted data is larger than, or equal to the determined number, this user is classified as the point-not-applicable user (step S205). On the other hand, in the case that the data is not extracted and a total number of extracted data is smaller than the defined number, the Web control unit performs a user separation process operation based upon a point resource corresponding to a second separation process condition (step S202). Since such a process operation (defined at step S201) is carried out, such a user who has accessed the relevant site plural times larger than, or equal to the defined times within the defined time period may be classified as the point-not-applicable user.

Next, a description will now be made on the user separation process operation (step S202) based upon the point resource corresponding to the second separation condition. The user separation operation based on the point resource is executed in such a manner that users are separated from each other based on a remaining point number by investment of an advertisement sponsor.

As described above, the point producing unit 14 sets the point appearing time per 1 day in the sponsor point management file 28. On the other hand, the access management file 29 manages a history of access conditions of this Web site. The Web control unit 11 may predict an access time of a user per 1 day based upon this history. Alternatively, with respect to this access time prediction value, an advertisement sponsor may adjust the access time prediction value by considering conditions of a campaign and the like.

The Web control unit 11 executes the user separation process operation by using a ratio of this point appearing time to the access time prediction value. In other words, for instance, assuming now that the point appearing time is equal to 100 times and the access time prediction value is equal to 400 accesses on a certain day, the Web control unit 11 performs a process operation based on another condition (step S203) corresponding to a next user separation process operation with respect to such users corresponding to 25% of the entire access time, and classifies the remaining users as the point-not-applicable user (step S205). At this time, a method for specifying the users corresponding to 25% of the entire access time may be arbitrarily determined. For instance, the Web control unit 11 extracts one access time at random from continuous 4 access times, and may classify the user as a user corresponding to this access operation. Also, the Web control unit 11 may classify the user as a user corresponding to 100 accesses of a first arrival. While this separating process operation is carried out, the users who access this relevant site may be separated from each other based upon the above-explained probability.

The Web control unit 11 may execute user separation process operations based upon various conditions (defined at step S203) other than the above-described user separation process based on the access times of the same user within the defined time period (step S201) and the user separation operation based upon the point resource (step S203). For example, when the probability that a user may gain the points is restricted by a law and a regulation, the Web control unit 11 may execute the user separation process operation based upon such a probability condition capable of clearing this restriction. The user who can satisfy this condition may finally become the point-applicable user (step S204).

As previously explained, the separating process operation for separating the point-applicable user from the point-not-applicable user has been described. It should also be noted that the sequences of the user separation process operations based upon these separation conditions may be varied, and may freely be combined with each other. For example, while no judgment is made as to the separating process operation (step S203) based upon another condition equal to the third condition, the Web control unit 11 may classify all of such users who can satisfy both the first condition and the second condition as the point-applicable users (step S204).

(Menu Page Display Process)

When the user separation process operation is accomplished, the Web control unit 11 causes the display apparatus of the terminal computer 30 to display thereon a menu page. As previously explained, as the menu page, there are the menu page 340 attached with the point, and the normal menu page 350. Then, with respect to such a user who is classified as a point-applicable subject by executing the above-explained user separation process operation, the Web control unit 11 displays such a page 320 for notifying that the user becomes the point-applicable user, and thereafter, displays the menu page 340 attached with the point. On the other hand, as to such a user who is classified as a point-not-applicable subject, the Web control unit 11 displays such a page 330 for notifying that this user becomes the point-not-applicable user, and thereafter, displays the normal menu page 350.

At this time, for example, the same numerals such as "777" are arranged to be displayed on the page 320 for notifying that the user becomes the point-applicable user, whereas the random numerals such as "735" are arranged to be displayed on the page 320 for notifying that the user becomes the point-not-applicable user. This may conduct such an atmospheric mood that a point-applicable subject is separated from a point-not-applicable subject by a throttle machine. Thus, the user separation process operation may have a game characteristic.

Figure 10:
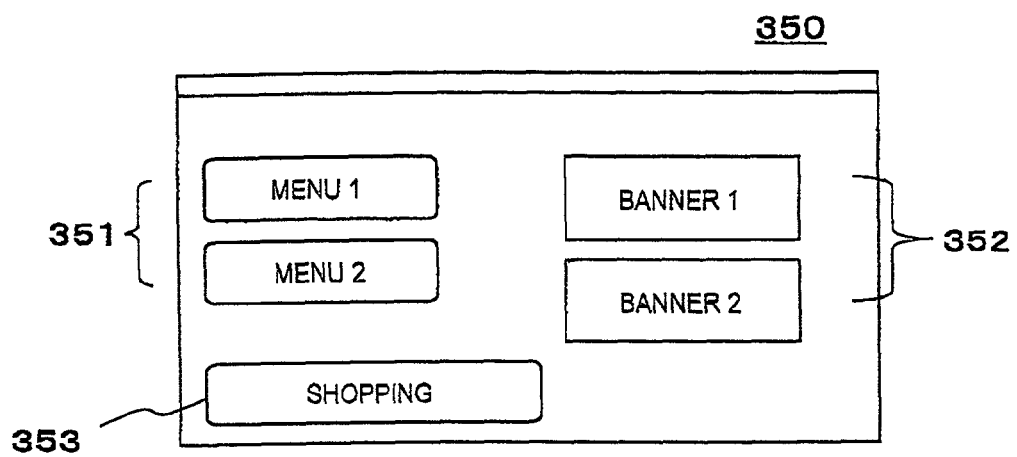
FIG. 10 is a diagram for explaining an example of a normal menu page 350.

FIG. 10 is a diagram for indicating an example of the normal menu page 350. In this drawing, a menu button group 351 used to transfer to Web pages of various sorts of contents, a banner advertisement group 352 which displays banner advertisements, and a shopping button 353 used to transfer to a shopping mall are arranged in this normal menu page 350.

Figure 11:
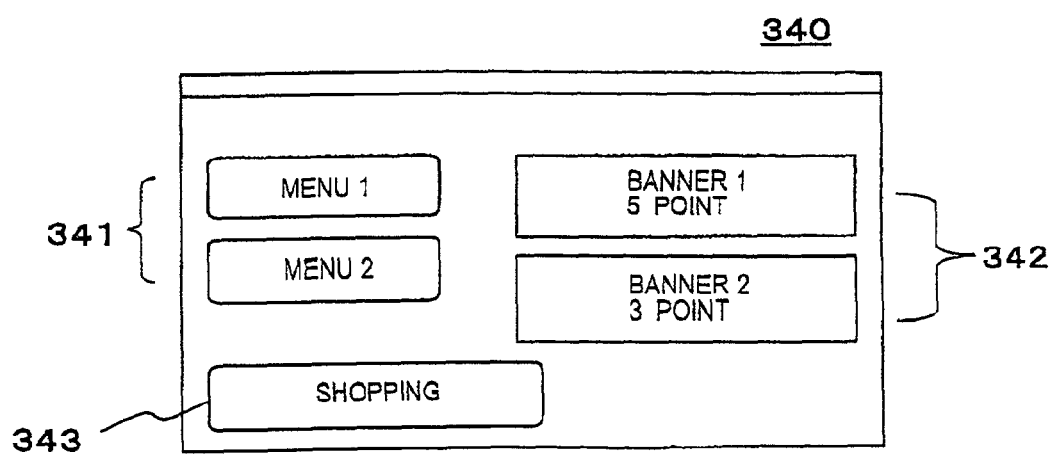
FIG. 11 is a diagram for explaining an example of menu page 340 with an incentive point.

FIG. 11 is a diagram for representing an example of the menu page 340 attached with the point. In this drawing, a menu button group 341 used to transfer to Web pages of various sorts of contents, a banner advertisement group 342 attached with points, on which the point are displayed, and a shopping button 343 used to transfer to a shopping mall page are arranged on the menu page 340 attached with the point.

(Point Producing Process Operation)

Next a description will now be made on a process operation for producing a point displayed on a banner advertisement of the menu page 340 attached with the point. As previously explained, the distribution of the points is played on the banner advertisement can be controlled by the advertisement sponsor. However, a degree of points which are actually displayed to every user is produced every time of displaying the banner advertisement in accordance with the below-mentioned process operation.

A point to be displayed is produced based upon a point degree 28521, a point-appearing time 28522 thereof, and a point-appeared time 28523 thereof, and personal information of a user, which are set to the sponsor point management file 28. As the user personal information, there are provided a total gained-point number of this user, a gained-point number with respect to one banner advertisement, a gained-point number within a predetermined time period with respect to one banner advertisement, and a purchase history. All of the above-explained information is recorded on the point management file 21 or the like. In such a case that an age, a sex, a taste and the like of a user are recorded on the user registration information file 22, a point may be produced based upon these above-explained information. These information will be referred to as "point variation factors."

First, the point producing unit 14 produces a list of degrees of points which may be displayed on a banner advertisement, with reference to the sponsor point management file 28. Then, the point producing unit 14 determines a degree of points to be displayed from the list of the displayable point degree based upon the point variation factors.

A method for producing a point based upon these point variation factors may be arbitrarily selected. For instance, a point variation rule related to a variation factor to be applied is provided, and this point variation rule is stored in the sponsor point management file 28, or stored in connection with this sponsor point management file 28. Thus, the point producing unit 14 may produce a point with reference to this rule. Next, a description will now be made on a process operation with reference to an example in such a case that a rule employing gained points with respect to one banner advertisement as the variation factor is set.

Figure 12:
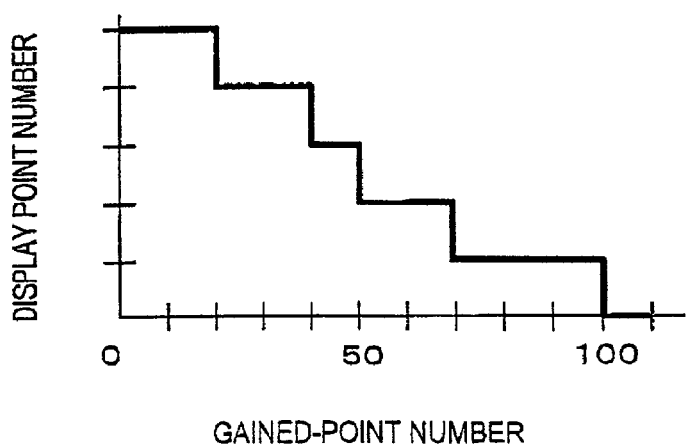
FIG. 12 is a diagram for explaining an image of a point change rule as to a total gained-point number with respect to one banner advertisement.

FIG. 12 is a diagram for representing an image of a point variation rule as to a total gained-point number with respect to one banner advertisement. An abscissa of this drawing indicates the total gained-point number with respect to one banner advertisement, and an ordinate thereof denotes a relative value of a displayed point number. In this case, the relative value of the displayed point degree corresponds to a value used to be related to a degree of a displayable point. For example, this relative value of the displayed point degree implies "largest degree selected from displayable point degrees", and "third largest degree." In this drawing, the relative value is sectioned into 5 stages. A line indicated by this rule represents such an appearance that the larger the gained-point number becomes, the smaller the displayed point degree becomes stepwise. For example, when the gained-point number is smaller than, or equal to 20, the highest point among the displayable points is indicated. Subsequently, the larger the gained-point number becomes, the smaller the displayed point degree becomes stepwise. Then, when the total gained-point number exceeds 100, the point as to this banner advertisement is no longer displayed. As explained above, in this example, the point producing unit 14 produces the degree of the point to be displayed based upon both the point variation rule and also the list of the displayable point degree.

As a consequence, when a certain user displays a banner advertisement in the first time, the higher point degree is displayed among the degree 28521 determined in the point distribution table 2852. If the user displays the same banner advertisement many times, then the displayed point (namely, gained-point number) is gradually decreased. Then, the decreased points of the displayed points with respect to this user are allocated to other users who have not yet sufficiently gained the points, so that the points which are provided by the same advertisement sponsor may be widely applied to many users.

As to a displayed point, when a user clicks a banner advertisement, this user may get this displayed point. The point producing unit 14 rewrites both the point-appeared number 2854 and the remaining point number 2853, which are recorded in the relevant banner advertisement data within the sponsor point management file 28.

Next, a process operation will now be explained when the user information is employed as the variation factor. It is so assumed that such information that a user is 10-year-old generation, and has a hobby of TV games is stored in the user information 289 of the sponsor point management data 280. The point producing unit 14 checks information as to ages and tastes of the registered users with reference to the user registration information file 22. Then, when such a record that the user who constitutes the point-applicable user is the 10-year-old generation and has the hobby of TV games is made in this user registration information file 22, the point producing unit 14 displays a higher point degree among the point degrees set by the point distribution table 285. As a result, it is possible to establish such an advertisement strategy limited to a specific user layer.

As to other variation factors, the points may be similarly controlled so as to produce proper points. Further, it is possible to employ a point variation rule in a combination of a plurality of variation factors. Similar to the change in the sponsor point management data 280, the variation factor may be adjusted by the advertisement sponsor. Alternatively, the variation factor may be adjusted by the advertisement space provider.

Thus, the process operation for producing the points to be displayed on the banner advertisement of the menu page 340 attached with the point has been explained in the foregoing description.

In this case, it is so assumed that the point banner advertisement file 23 placed on the menu page 340 attached with the point, and the normal banner advertisement file 24 placed on the normal menu page 350 are provided in the separate storage apparatus. The banner advertisement is intended to be inserted in this page as the compensation of the sponsor investment. When such a trouble happens, namely, when the banner advertisement cannot be placed due to troubles in the storage apparatus, confidence of the advertisement space provider will be lowered. As a consequence, even when one of these separate storage apparatus is brought into the malfunction state, the banner advertisement file stored in the other storage apparatus may be temporally utilized.

As a consequence, the Web control unit 11 monitors the operation conditions of these storage apparatus into which the respective files are recorded. In the case that the operation of one storage apparatus is stopped, the Web control unit 11 immediately can use the other storage apparatus so as to produce the banner advertisement. In other words, the image data which is used to produce the banner advertisement and also is stored into both the point banner advertisement file 23 and the normal banner advertisement file 24 may be related to such image data related to the same advertisement sponsor to each other.

(Point Managing Process Operation)

As explained above, the user can get the displayed point by clicking the banner advertisement attached with the point. At this time, the Web control unit 11 manages the points applied to the user in accordance with the below-mentioned process operation.

Upon receipt of clicking operation of such a banner advertisement on which the point is indicated, the Web control unit 11 records both the point degree as displayed and the information related to this point on the point management file 21.

FIG. 13 is a diagram for indicating an example of the data structure of the point management data 210 recorded in the point management file 21.

In this drawing, as the point number 211, a total gained-point number is recorded. As the sponsor ID 212, a sponsor ID used to identify an advertisement sponsor who provides a point is recorded. As the banner advertisement ID 213, a banner advertisement ID used to identify a banner advertisement on which a point is displayed is recorded. As the user ID 214, a user ID of a user who can get a point is recorded. As the point-gained date 215, a date on which a point is gained is recorded. As the point valid time period 216, in the case that a valid time period is defined to a gained point, the date of this valid time period is recorded. It should be noted that the valid time period of the point may be set based upon the valid time period 288 of the sponsor point management data 280, as explained above.

To the point which is gained by the user in the above manner, the identification information of the sponsor who provides this point is added. Then, the resultant point is recorded. The advertisement sponsor can grasp how to use the provided point, while employing this identification information as a key.

(Use of Point)

Next, an explanation will now be made as to the use of points in a shopping mall opened by an advertisement space provider in this site.

Figure 6:
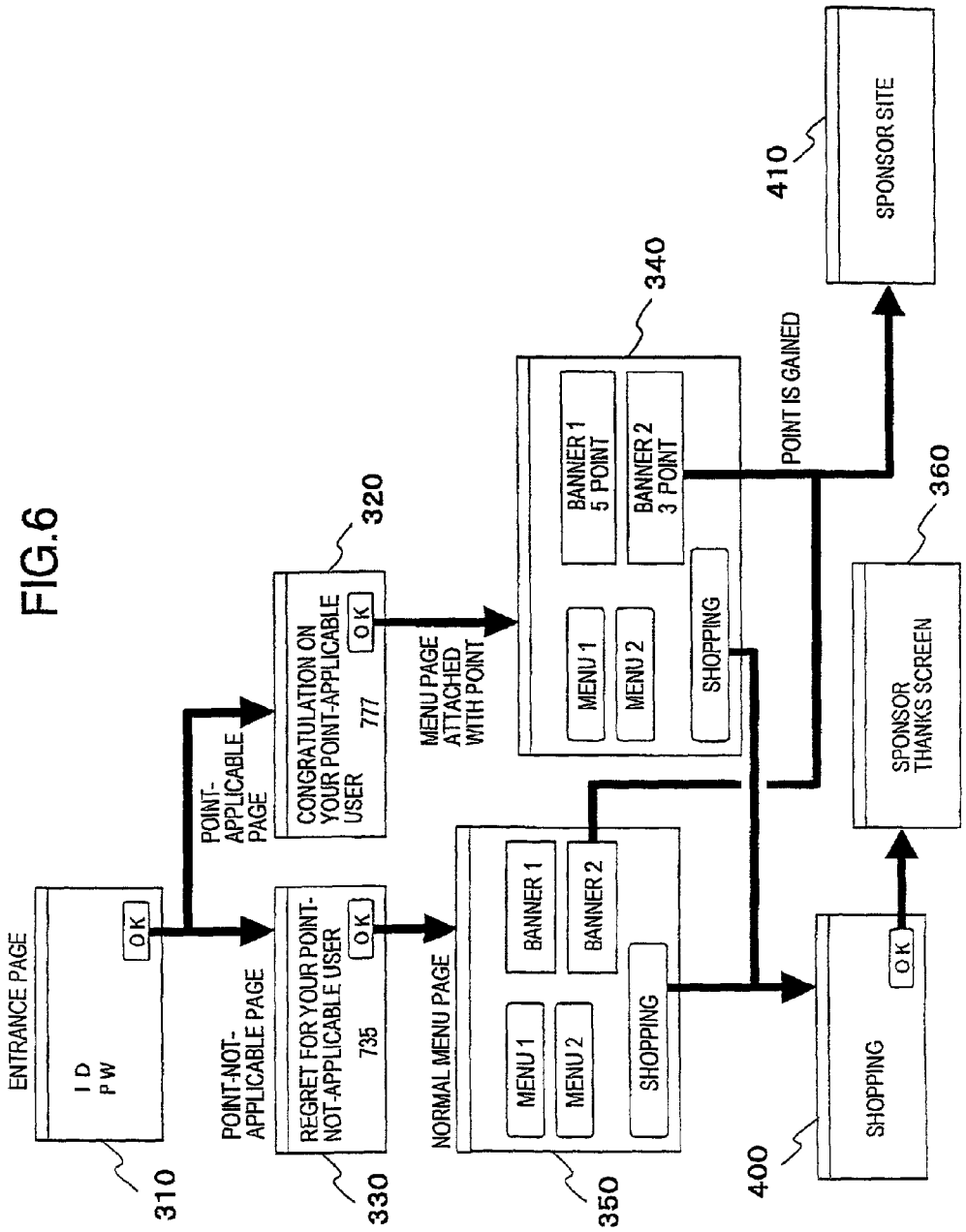
FIG. 6 is a diagram for explaining transition of a Web page in a Web site opened by an advertisement space provider.

The Web control unit 11 displays such a shopping mall 400 as indicated as an example in FIG. 6 in the case that the Web control unit 11 accepts clicking of the shopping button of either the menu page 340 attached with the point or the normal menu page 350.

The user can view such a Web page which places thereon goods which is wanted to be purchased by the user in the shopping mall, and can perform the purchase procedure by designating specific goods. Since the various procedures for viewing the Web page on which the goods is placed, for designating the goods, for designating the payment way, and for settling the purchase amount are similar to those of the normal shopping mall, descriptions thereof are omitted.

Figure 14:
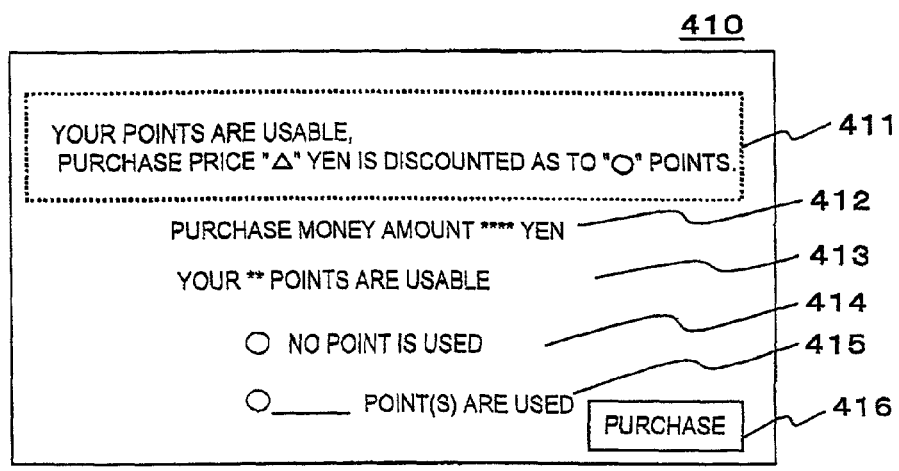
FIG. 14 is a diagram for explaining an example of a point use procedure page 410.

After accepting the designation of the goods in the shopping mall, the Web control unit 11 displays such a point utilizing procedure page 410 as represented as an example in FIG. 14 on the display apparatus of the terminal computer 30 as a portion of the purchase procedure. Alternatively, this page 410 may be displayed only to the users who own the points.

The point utilizing procedure page 410 in this drawing is constructed by arranging a column 411, a column 412, a column 413, a column 414, a column 415, and a purchase button 416 for executing a purchase. The column 411 indicates an explanation as to such a message that the point can be used, and also as to a method for converting a point into a discount amount. The column 412 indicates a purchase amount of the designated goods. The column 413 indicates a total remaining point number owned by the user. The column 414 is used to designate that a point is not used. The column 415 is used to designate that a point is utilized, and also is to enter a use degree. In this case, the Web control unit 11 displays the total remaining point number owned by the user, by extracting the gained points by referring to the point management file 21, while using the user ID 214 as a key, and then calculating a total gained-point number to be displayed.

When such a designation from the user that the user does not use the point is accepted, the Web control unit 11 executes the settlement process based upon the total money amount displayed on the column 412 indicative of the purchase amount.

On the other hand, when the Web control unit 11 accepts such a message that the user uses the points, and also the designation from the user of the use degree, the Web control unit 11 performs the settlement process based upon such a money amount obtained by subtracting a money amount which is produced by converting the point to be used degree into the money amount from the money amount indicated in the column 412 for indicating the purchase amount.

Then, the Web control unit 11 deletes the point data corresponding to the used points from the point management file 21. Alternatively, while a used flag area is provided in the point management data 210, the Web control unit 11 may mark the used flag of the point data corresponding to the used point.

As described above, in this site, since the user uses the points provided based upon the investment of the advertisement sponsor, the purchase price may be discounted in the shopping mall opened by the advertisement space provider. By the introduction of this procedure, the advertisement space provider can cause the user purchase incentives based upon the discounted purchase price without paying the discounted money amount.

It should also be noted that the points might be replaced by premium goods in addition to utilizations in the discount shopping by converting the point into money amount.

("Thanks" Screen Display)

Figure 15:
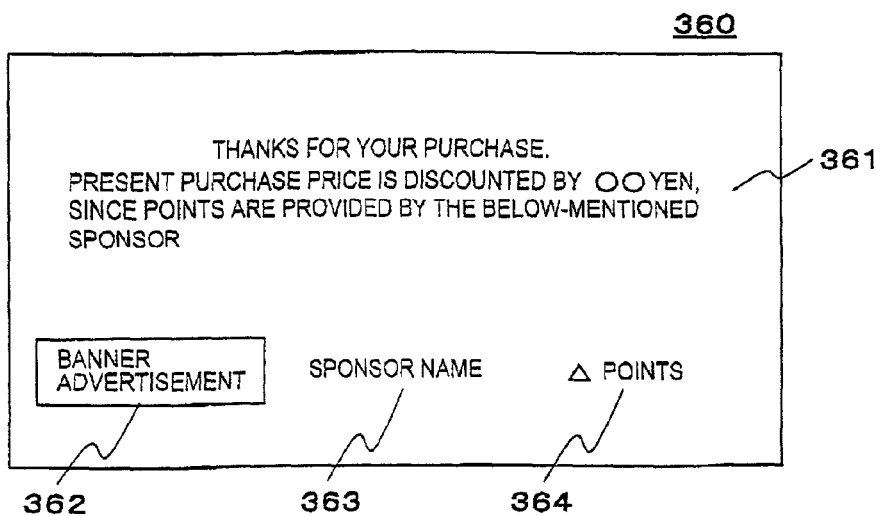
FIG. 15 is a diagram for explaining an example of a "Thanks screen" 360.

When the purchase procedure of the goods using the points is accomplished, the server system 10 displays a "Thanks" screen 360 on the display apparatus of the terminal computer 30. FIG. 15 is a diagram for indicating an example of a Thanks screen 360. In this drawing, the Thanks screen 360 is provided with a column 361, a column 362, a column 363, and a column 364. The column 361 indicates both a sentence indicative of a thank for a purchase, and a discount money amount. The column 362 shows a banner advertisement of a sponsor who provides a point. The column 363 indicates a name of a sponsor who provides a point. The column 364 shows a total number of provided points.

When a user uses a point, in such a case that there are plural advertisement sponsors who provide points, several methods may be employed so as to utilize the point provided by any one of these advertisement sponsors.

For example, it is possible to set such a manner that the points which have been temporally acquired earlier or later may be automatically and sequentially used. Alternatively, a list of the gained points is displayed in combination with the information of the advertisement sponsor which provides the point, the selection of the points to be used by the user may be accepted.

Figure 16:
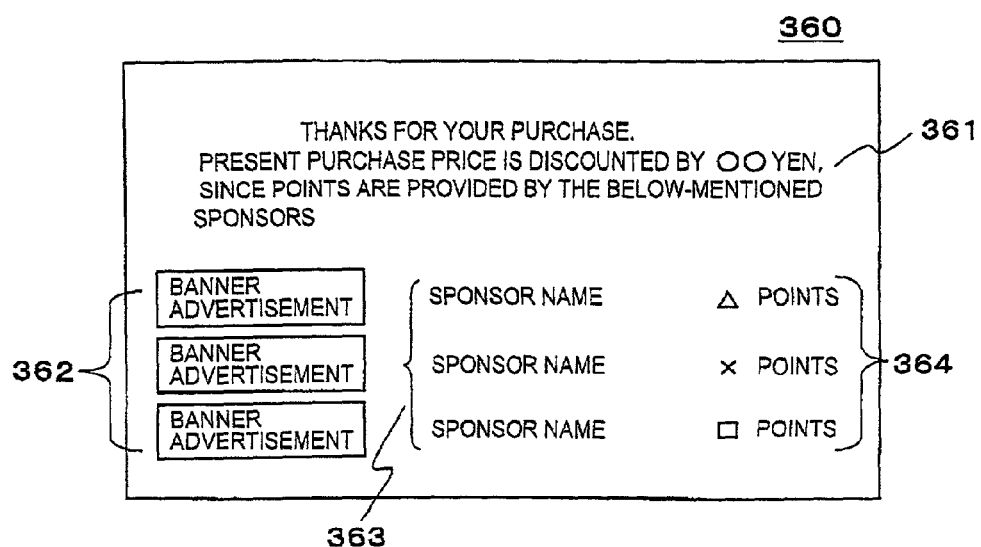
FIG. 16 is a diagram for explaining another example of the "Thanks screen" 360.

As a result, in the case that there are plural advertisement sponsors who provide the points to be used, as represented as an example in FIG. 16, the respective provided point number and also the point providing sponsors are displayed on the Thanks screen 360. In this drawing, the Thanks screen 360 is formed by arranging the column 361, a column 365, a column 366, and a column 367 indicative of a plurality of provided point numbers. This column 361 shows a sentence indicative of thankfulness for a purchase, and also a discount money amount. The column 365 indicates banner advertisements of the plural sponsors who provide the points. The column 366 indicates a plurality of sponsor names who provide the points.

As explained above, when a point is used, a name of the advertisement sponsor who provides this point is indicated. As a consequence, the advertisement effects achieved in this site can be further improved with respect to the advertisement sponsor.

What is claimed is:

1. An advertisement supplying system for displaying a point which gives viewing persons an incentive to view an advertisement in combination with advertisement information on a terminal apparatus connected thereto via a computer network, comprising:
    a memory storing thereinto identification information of a customer and a point degree owned by the customer in relation to each other;
    a user interface accepting the identification information of the customer from a terminal apparatus of the customer; and
    a web control unit acquiring the point degree owned by the customer from said memory, said owned point degree being related to the accepted identification information of the customer,
    wherein the web control unit determines a display point degree to be displayed in combination with the advertisement information based upon a relationship between the point degree owned by the customer and the display point degree with reference to a predetermined rule,
    said rule being that a point degree owned by the customer increases in response to the customer selecting the advertisement and the display point degree decreases for display in combination with a subsequent display of the advertisement information, and
    the display point degree does not decrease to zero for the subsequent display of the advertisement information in response to the customer first selecting the advertisement.

2. The advertisement supplying system as claimed in claim 1 wherein:
    a minimum value of the point degree to be displayed is equal to 0.

3. An advertisement supplying system for displaying a point which gives viewing persons an incentive to view an advertisement in combination with advertisement information on a terminal apparatus connected thereto via a computer network, comprising:
    a memory for storing thereinto identification information of a customer and personal information related to the customer in relation to each other;
    a user interface accepting the identification information of the customer from a terminal apparatus of the customer; and
    a web control unit acquiring the personal information related to the customer from said memory, said personal information being related to the accepted identification information of the customer,
    wherein the web control unit determines a display point degree to be displayed in combination with the advertisement information based upon a relationship between the point degree owned by the customer and the display point degree with reference to a predetermined rule,
    said rule being that a point degree owned by the customer increases in response to the customer selecting the advertisement and the display point degree decreases for display in combination with a subsequent display of the advertisement information, and
    the display point degree does not decrease to zero for the subsequent display of the advertisement information in response to the customer first selecting the advertisement.

4. The advertisement supplying system as claimed in claim 3 wherein:
    the personal information related to the customer corresponds to information as to at least any one of a sex of the customer, an age thereof, and a taste thereof.

5. A computer readable medium for causing a computer to function as an advertisement supplying system for displaying a point which gives viewing persons an incentive to view an advertisement in combination with advertisement information on a terminal apparatus connected thereto via a computer network, the computer readable medium having encoded thereon computer codes which when executed on a processor perform the steps of:
    storing identification information of a customer and a point degree owned by the customer in relation to each other;
    accepting the identification information of the customer from a terminal apparatus of the customer;
    acquiring the point degree owned by the customer related to the accepted identification information of the customer; and
    determining a display point degree to be displayed in combination with the advertisement information based upon a relationship between the point degree owned by the customer and the display point degree with reference to a predetermined rule; wherein
    said rule being that a point degree owned by the customer increases in response to the customer selecting the advertisement and the display point degree decreases for display in combination with a subsequent display of the advertisement information, and
    the display point degree does not decrease to zero for the subsequent display of the advertisement information in response to the customer first selecting the advertisement.

6. A computer readable medium for causing a computer to function as an advertisement supplying system for displaying a point which gives viewing persons an incentive to view an advertisement in combination with advertisement information on a terminal apparatus connected thereto via a computer network, the computer readable medium having encoded thereon computer codes which when executed on a processor perform the steps of:
    storing identification information of a customer and personal information related to the customer in relation to each other;

accepting the identification information of the customer from a terminal apparatus of the customer acquiring the personal information related to the customer, said personal information being related to the accepted identification information of the customer; and determining a display point degree to be displayed in combination with the advertisement information based upon a relationship between the point degree owned by the customer and the display point degree with reference to a predetermined rule; wherein said rule being that a point degree owned by the customer increases in response to the customer selecting the advertisement and the display point degree decreases for display in combination with a subsequent display of the advertisement information, and the display point degree does not decrease to zero for the subsequent display of the advertisement information in response to the customer first selecting the advertisement.

7. A method of displaying a point in an advertisement supplying system which gives viewing persons an incentive to view an advertisement in combination with advertisement information on a terminal apparatus connected thereto via a computer network, the method comprising the steps of:

a) storing identification information of a customer and a point degree owned by the customer in relation to each other;

b) accepting the identification information of the customer from a terminal apparatus of the customer;

c) acquiring the point degree owned by the customer from a storage means, said owned point degree being related to the accepted identification information of the customer;

d) determining a display point degree to be displayed in combination with the advertisement information based upon a relationship between the point degree owned by the customer and the display point degree with reference to a predetermined rule; wherein said rule being that a point degree owned by the customer increases in response to the customer selecting the advertisement and the display point degree decreases for display in combination with a subsequent display of the advertisement information, and the display point degree does not decrease to zero for the subsequent display of the advertisement information in response to the customer first selecting the advertisement.

* * * * *